(12) United States Patent
Ellis (10) Patent No.: US 8,795,590 B1
(45) Date of Patent: Aug. 5, 2014

(54) APPARATUS, SYSTEM AND METHOD FOR REDUCING THE GROWTH OF MICROBIAL CONTAMINATION IN AN AIR-HANDLING UNIT

(71) Applicant: RGF Environmental Group, Inc., Riviera Beach, FL (US)

(72) Inventor: Walter B. Ellis, Jupiter, FL (US)

(73) Assignee: RGF Environmental Group, Inc., Riviera Beach, FL (US)

(*) Notice: Subject to any disclaimer, the term of this patent is extended or adjusted under 35 U.S.C. 154(b) by 60 days.

(21) Appl. No.: 13/749,570

(22) Filed: Jan. 24, 2013

(51) Int. Cl.
*A61L 2/00* (2006.01)
*B01D 17/06* (2006.01)
*B01J 19/08* (2006.01)
*F17D 5/00* (2006.01)
*A61L 2/02* (2006.01)

(52) U.S. Cl.
CPC ... *A61L 2/02* (2013.01); *F17D 5/00* (2013.01); *Y10S 422/906* (2013.01); *Y10S 422/907* (2013.01)
USPC ....... 422/23; 422/1; 422/186.04; 422/186.13; 422/906; 422/907; 210/748.01; 204/554

(58) Field of Classification Search
CPC .............. A61L 2/00; A61L 2/035; C02F 1/00
USPC ............ 422/1, 23, 186.04, 186.13, 906–907; 210/748.01; 204/554
See application file for complete search history.

(56) References Cited

U.S. PATENT DOCUMENTS

2003/0044310 A1* 3/2003 Takahashi et al. .............. 422/22

* cited by examiner

*Primary Examiner* — Monzer R Chorbaji
(74) *Attorney, Agent, or Firm* — Rothwell, Figg, Ernst & Manbeck, P.C.

(57) ABSTRACT

An apparatus, system and method for reducing the growth of microbial contamination, such as bacteria, virus, mold and biofilms, in an air-handling unit. The apparatus includes a mounting member configured to couple with a housing of an air-handling unit and a turbine coupled with the mounting member and configured to produce energy when positioned in an air flow path through the air-handling unit. The apparatus also includes an electrode assembly including an anode configured to be placed in a condensate pan and receive energy from the turbine. The anode produces agents that reduce the growth of microbial contamination when energized.

36 Claims, 11 Drawing Sheets

APPARATUS, SYSTEM AND METHOD FOR REDUCING THE GROWTH OF MICROBIAL CONTAMINATION IN AN AIR-HANDLING UNIT

TECHNICAL FIELD

The present invention relates generally to the field of air filtration and, more particularly, to an apparatus, system and method for reducing the growth of microbial contamination, such as bacteria, virus, mold and biofilms, in an air-handling unit.

BACKGROUND

Traditional air-handling units will accumulate condensation from the moisture in the air passing through the unit. In order to prevent water damage from the condensation build up, air-handling units generally include a condensation drain system. A condensation drain system may include a drain line and a condensation pan configured to collect the drained condensation and convey it away from the HVAC unit to a suitable water discharge location.

Traditional condensation drain systems are prone to clogging and require maintenance because of bacteria, virus, mold and biofilm buildup, and from corrosion to the system caused by the condensation. A corroded primary and or secondary condensation pan can develop leaks which will allow the collected moisture to leak on to the house, building, vessel, or other machinery that needs to be kept dry. The bacteria, virus, mold and biofilm contained in the drain system can form clogs in the drain line which prevent the condensation from reaching the discharge location. Further, the bacteria, virus, mold and biofilm build up within the condensation system can be unsanitary and pose health problems (e.g., *Legionella pneumophila*).

Therefore, a need exists to treat condensation drainage systems to prevent corrosion and the build-up of bacteria, viruses, mold and biofilms which may clog the system and require maintenance. The present invention addresses the shortcomings of traditional condensation drainage systems and methods.

SUMMARY

Particular embodiments of the present invention are directed to an apparatus, system and method for reducing the growth of microbial contamination, such as bacteria, virus, mold and biofilms, in an air-handling unit.

According to particular embodiments of the present invention, an apparatus for reducing the growth of microbial contamination in air-handling unit comprises a mounting member configured to couple with a housing of an air-handling unit and a turbine coupled with the mounting member and configured to produce energy when positioned in an air flow path through the air-handling unit. The apparatus also includes an electrode assembly including an anode configured to be placed in a condensate pan and receive energy from the turbine. The anode produces agents that reduce the growth of microbial contamination when energized.

In some embodiments, the anode produces agents that reduce the growth of microbial contamination, such as bacteria, virus, mold and biofilms.

In some embodiments, the mounting member of the apparatus includes a magnetic base configured to couple with the housing of the air-handling unit.

In some embodiments, the mounting member of the apparatus includes a support arm and the turbine is coupled to the support arm.

In some embodiments, the angle of the turbine relative to the support arm is adjustable. The support arm may include a plurality of coupling points and a coupling member configured to couple the turbine to at least one of the plurality of coupling points.

In some embodiments, an angle of the turbine relative to the mounting member is adjustable.

In some embodiments, the anode is coupled to the turbine by a wire, and the wire is configured to transfer energy from the turbine to the anode. The anode may be comprised of silver and configured to release silver ions when energized. The anode may be comprised of copper and configured to release copper ions when energized.

In some embodiments, the turbine is a wind turbine. The turbine may include a turbine arm, a rotor housing and a rotor. The rotor may include a plurality of blades.

In some embodiments, the apparatus includes a cathode configured to assist the anode to produce agents to reduce the growth of microbial contamination.

According to particular embodiments of the present invention, an air-handling system comprises an air-handling unit including a housing, a fan, a condensate line and a condensate pan. The fan is capable of generating a flow of air through the air treatment apparatus. The air-handling unit also includes an apparatus for reducing the growth of microbial contamination in the air-handling unit. The apparatus comprises a mounting member configured to couple with a housing of an air-handling unit and a turbine coupled with the mounting member and configured to produce energy when positioned in an air flow path through the air treatment apparatus. The apparatus further includes an electrode assembly including an anode configured to be placed in the condensate pan and receive energy from the turbine. The anode produces agents that reduce the growth of microbial contamination when energized.

In some embodiments, the anode produces agents that reduce the growth of microbial contamination, such as bacteria, virus, mold and biofilms, In some embodiments, the mounting member includes a magnetic base configured to couple with the housing of the air-handling unit.

In some embodiments, the mounting member includes a support arm and the turbine is coupled to the support arm. The angle of the turbine relative to the support arm may be adjustable. The support arm may include a plurality of coupling points and a coupling member configured to couple the turbine to at least one of the plurality of coupling points.

In some embodiments, an angle of the turbine relative to the mounting member is adjustable.

In some embodiments, the anode is coupled to the turbine by a wire, and the wire is configured to transfer energy from the turbine to the anode.

In some embodiments, the anode is configured to release silver ions when energized. The anode may be configured to release copper ions when energized.

In some embodiments, the turbine is a wind turbine. The turbine may include a turbine arm, a rotor housing and a rotor. The rotor may include a plurality of blades.

In some embodiments, the anode is comprised of silver. The anode may be comprised of copper.

According to particular embodiments of the present invention, a method for reducing microbial contamination in an air-handling unit comprises the steps of mounting a turbine to the air-handling unit such that the turbine is positioned in a flow of air through the air-handling unit and placing an anode configured to produce agents that reduce the growth of microbial contamination when energized in a condensate pan of the air-handling unit. The anode is configured to receive energy from the turbine.

In some embodiments, the anode is configured to produce agents that reduce the growth of microbial contamination, such as bacteria, virus, mold and biofllms.

In some embodiments, the method further comprises the step of adjusting the angle of the turbine relative to the flow of air through the air-handling unit.

In some embodiments, the anode is configured to produce silver ions.

In some embodiments, the anode is configured to produce copper ions.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

FIG. 1 illustrates a schematic view of an air-handling system including an apparatus for reducing the growth of microbial contamination in accordance with exemplary embodiments of the present invention.

FIG. 2 illustrates a perspective view of a turbine and mount in accordance with exemplary embodiments of the present invention.

FIG. 3 illustrates a bottom view of a turbine and mount in accordance with exemplary embodiments of the present invention.

FIG. 4 illustrates a top view of a turbine and mount in accordance with exemplary embodiments of the present invention.

FIG. 5 illustrates a side view of a turbine and mount in accordance with exemplary embodiments of the present invention.

FIG. 6 illustrates a perspective view of a turbine in accordance with exemplary embodiments of the present invention.

FIGS. 7(*a*)-(*b*) illustrate a rotor and a turbine shell for a turbine in accordance with exemplary embodiments of the present invention.

FIG. 8 illustrates a perspective view of a base for a turbine mount in accordance with exemplary embodiments of the present invention.

FIG. 9 illustrates a perspective view of a support arm for a turbine mount in accordance with exemplary embodiments of the present invention.

FIG. 10 illustrates a perspective view of an electrode assembly in accordance with exemplary embodiments of the present invention.

FIG. 11 illustrates a perspective view of an air-handling system including an apparatus for reducing the growth of microbial contamination in accordance with exemplary embodiments of the present invention.

FIG. 12 illustrates a top view of an air-handling system including an apparatus for reducing the growth of microbial contamination in accordance with exemplary embodiments of the present invention.

FIGS. 13(*a*)-(*c*) illustrate an air-handling system including an apparatus for reducing the growth of microbial contamination in which the position of the turbine relative to the mount is adjusted in accordance with exemplary embodiments of the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art. Further, the terms and phrases used herein are not intended to be limiting; but rather, to provide an understandable description of the invention.

According to particular embodiments of the present invention, an apparatus for reducing the growth of microbial contamination in an air-handling unit includes a micro turbine configured to capture a small amount of wind energy from the air-handling unit and the energy is used to actively release agents for reducing microbial contamination, such as silver and copper ions, into the condensate water pan. The agents for reducing microbial contamination are produced by a replaceable electrode assembly including an anode coupled with the micro turbine. The apparatus is a self-contained unit and does not require any additional energy, i.e., all energy for the unit is provided by the captured wind energy. The apparatus includes a magnetic base configured to mount the pan turbine to the air-handling unit. The angle of the micro turbine relative to the magnetic base, and the direction of the flow of air through the air-handling unit, may be adjusted, which allows the amount of wind energy captured to be adjusted.

FIG. 1 illustrates a schematic view of an air-handling system including an apparatus for reducing the growth of microbial contamination in accordance with exemplary embodiments of the present invention. The air-handling system 100 includes an air-handling unit 102 and an apparatus for reducing the growth of microbial contamination 110. The air-handling unit 102 includes a fan 104 configured to create an air flow 105, a condensation pan 106, a coil 108 and a drain 107. The fan 104 creates an air flow 105, and the moisture in the air moving through the fan creates condensation on the coil 108. The condensation is directed to the condensation pan 106 and then flows to the drain 107. In general, bacteria and virus can accumulate in the condensation pan 106 and then drain 107, which can cause clogging which prevents condensation from flowing to the discharge point 107*a*. Further, the condensation pan 106 and drain 107 are susceptible to corrosion.

The apparatus 110 reduces the growth of microbial contamination, such as bacteria, virus, mold and biofilms, in the condensate pan 106 and the drain 107 and helps prevent corrosion. The apparatus 110 includes a mini-turbine 112, a mount 114, a wire 116 and an electrode assembly 118. The mini-turbine 112 is mounted to the air-handling unit 102 by the mount 114. The mount 114 can be magnetized and configured to be attracted to the material of the air-handling unit 112. In an embodiment of the present invention, the mount 114 may be any component capable of mounting the mini-turbine 112 to the air-handling unit, e.g., a plate with openings corresponding to openings in the air-handling unit and coupling members configured to simultaneously engage the holes in the plate and in the air-handling unit 102 or an appropriate adhesive in such cases the blower housing is made from plastic. The turbine 112 is mounted to the air-handling unit 102 such that it is in the path of the air flow 105. The position of the turbine 112 relative to the mount 114 may be adjusted, which also adjusts the turbine 112 relative to the flow of air 105. The angle of the turbine 112 relative to the air 105, which adjusts the amount of wind energy captured by the turbine 112. The turbine 112 captures wind energy from the air flow 105 and transfers energy via a wire 116 to the electrode assembly 118. This is advantageous because it does not require a direct wiring of the apparatus 110 to the air-handling unit 102 wiring. The electrode assembly 118 and turbine 112 may include a housing composed of a non-conductive material that isolates the apparatus 110 from the air-handling unit 102, which eliminates any potential issue of corrosion to the air-handling unit 102 caused by electrolysis due to the induced current. These potential issues could occur if the apparatus 110 took its power directly from the power supplied to the air-handling unit 102. Also, not wiring into the air-handling unit 102 prevents the air-handling unit 102 from being adulterated for any national research testing laboratory listing purposes.

The electrode assembly 118 is configured to actively release agents for reducing microbial contamination into the condensate water pan when it is energized. As discussed in further detail with reference with FIG. 10, the electrode assembly 118 may include an anode configured to produce copper ions or silver ions when it is energized. In an embodiment, the electrode assembly 118 may be replaceable. The electrode assembly 118 may include a quick disconnect configured to allow the electrode assembly 118 to be removed from the wire 116 and replaced with a new electrode assembly 118. The electrode assembly 118 is generally configured to last at least 2 years. In an embodiment of the present invention, the apparatus 110 also includes a cathode configured to assist the anode in production of agents for reducing microbial contamination. The cathode completes a circuit with the anode and helps to drive off the ions, such as copper and silver ions, from the anode. The cathode may be composed of zinc.

FIGS. 2-5 illustrate a mount and turbine for an apparatus for reducing the growth of microbial contamination in accordance with exemplary embodiments of the present invention. The apparatus 110 includes a turbine 112 coupled to a mount 114. The turbine 112 includes a turbine support arm 200, a rotor housing 202 and a rotor 204. The turbine support arm 200 coupled the turbine 112 to the mount 114. The rotor housing 202 supports and houses the rotor 204. The rotor 204 is configured to receive wind energy and translate it to electric energy according to known methods in the art. The support arm 200, rotor housing 202 and rotor 204 will be discussed in further detail with reference to FIGS. 6 and 7(*a*)-(*b*).

Referring now to FIGS. 2-5, the mount 114 includes a base 206 and a mount arm 208. The mount arm 208 may be coupled to the base 206 by a base coupling member 216. The mount arm 208 includes a plurality of openings 210 configured to receive a first coupling member 212 which couples the mount 114 to the turbine 112 at a first location. The mount 114 includes a second coupling member 214 configured to couple the mount 114 to the turbine 112 at a second location. As illustrated in FIGS. 13(*a*)-(*c*), the first coupling member 212 may be removed and the position of the turbine 112 relative to the mount 114 may be adjusted by pivoting the turbine 112 about the second coupling member 214. The turbine 112 may be locked into a desired position by engaging one of the first openings in the mount arm 210 and a first opening in the turbine support arm 602 (FIG. 6) with the first coupling member 212. The base 206 and mount arm 208 will be discussed in further detail with reference to FIGS. 8 and 9.

FIG. 6 illustrates a perspective view of a turbine for an apparatus for reducing the growth of microbial contamination in accordance with exemplary embodiments of the present invention. The turbine 112 includes a support arm 200, a rotor housing 202 and a rotor 204. The support arm 200 includes a base 600, a first turbine opening 602 and a second turbine opening 604. The first turbine opening 602 is configured to align with each of the plurality of first holes 210 in the mount support arm 208 and receive the first coupling member 212. The second turbine opening 704 is configured to align with the second support arm opening 908 (FIG. 9) and receive the second coupling member 214. In an embodiment of the present invention, the support arm 200 and rotor housing 202 may be composed of complementary turbine shell pieces described in further detail with reference to FIG. 7(*b*).

FIGS. 7(*a*)-(*b*) illustrate the components of the turbine in accordance with exemplary embodiments of the present invention. FIG. 7(*a*) illustrates a perspective view of a rotor for a turbine for an apparatus for reducing the growth of microbial contamination in accordance with exemplary embodiments of the present invention. The rotor 204 includes a plurality of blades 700 coupled to an axle assembly 702. The blades 700 are configured to transfer the wind energy into rotational energy and may be angled so as to better capture wind energy. The axle assembly 702 can include components for transferring the rotational energy of the plurality of blades 700 into electric energy. For example, the axle assembly 702 may include an electrical generator in communication with a shaft rotated by the plurality of blades 700. The axle assembly 702 may also include other components known in the art for transferring rotational energy to electric energy, such as a gear box. The axle assembly 702 is supported by a rotor frame 704 which houses the axle assembly 702 and the plurality of blades 700. The rotor frame 704 includes a plurality of openings 706 for coupling the rotor 704 with the rotor housing 202. The rotor frame 704 may be approximately square or any other shape configured to fit within the rotor housing 202.

FIG. 7(*b*) illustrates a turbine shell in accordance with exemplary embodiments of the present invention. The turbine shell 710 includes a handle portion 712, a base portion 714 and a rotor housing portion 716. The rotor housing portion 716 includes at least one shell coupling member 718 configured to couple with a member of a complementary shell piece. The at least one shell coupling member 718 can also be configured to couple with the rotor openings 706. In an embodiment of the present invention, two complementary turbine shell 710 pieces couple with each other to form the support arm 200 and rotor housing 202 of the turbine 112.

FIG. 8 illustrates a perspective view of a base for a mount in accordance with exemplary embodiments of the present invention. The base 206 may be composed of a magnetic material configured to be attracted to the air-handling unit 102 or of appropriate adhesive material for non-ferrous mounting locations. The base 206 may include an opening 800 configured to couple the base 206 with the mount arm opening 908 (FIG. 9) of the mount arm 208 via mount coupling member 216.

FIG. 9 illustrates a perspective view of a mount arm for a mount in accordance with exemplary embodiments of the present invention. The mount arm 208 includes a first member 900 and a second member 902, which are essentially identical. Each member includes a plurality of first openings 210 and at least one second opening 904. Each of the plurality of first openings 210 is configured to receive a first coupling member 212. The at least one second opening 904 is configured to receive the second coupling member 214. The first member 900 and the second member 902 are connected via a connecting member 906 such that the first member 900, the second member 902 and connecting member 906 form a U-shape. The connecting member includes the mount arm opening 908, which is configured to couple the mount arm 208 with the base 206 via mount coupling member 216.

Figure 1:
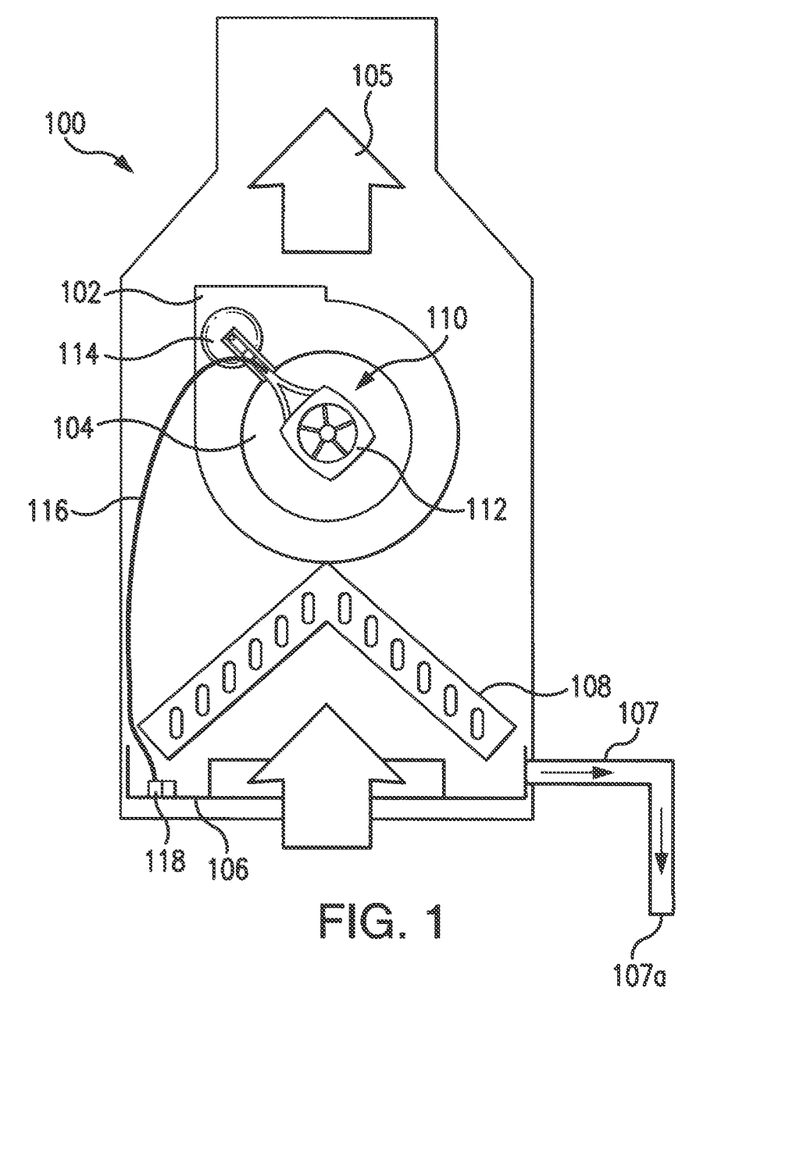
Figure 2:
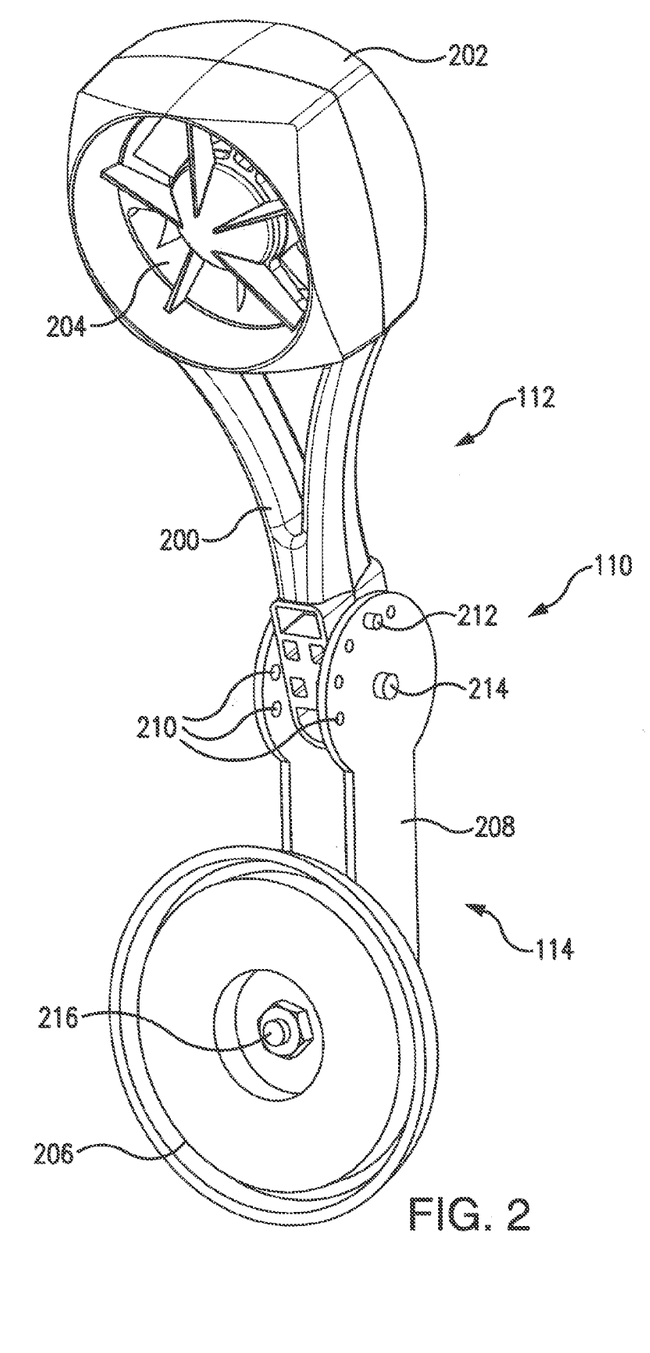
Figure 3:
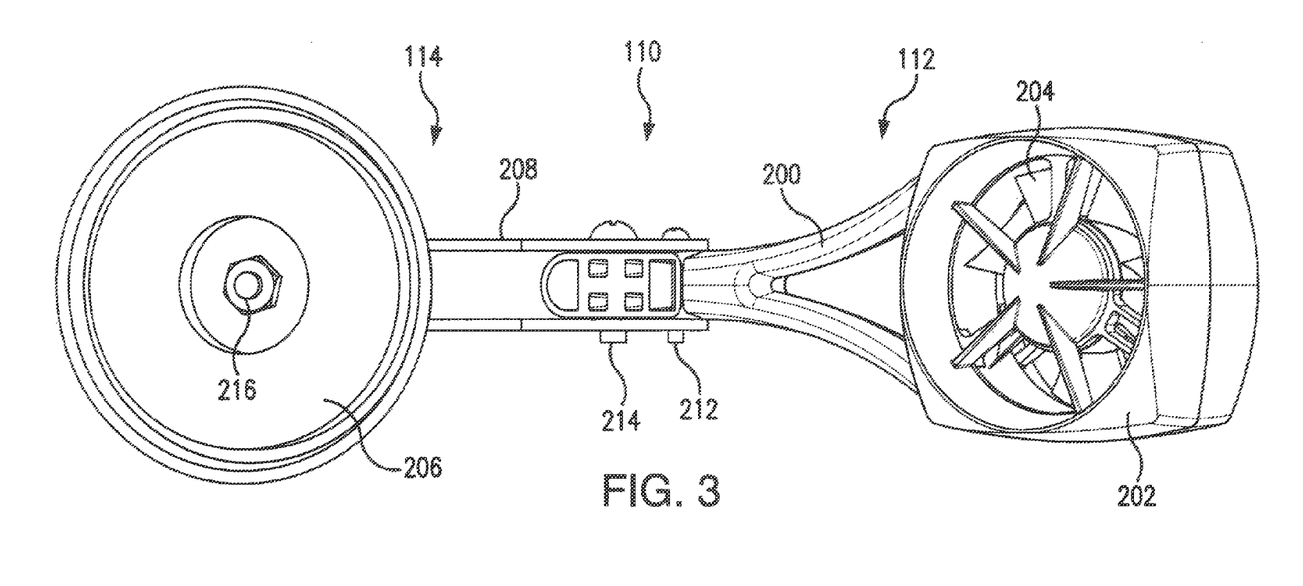
Figure 4:
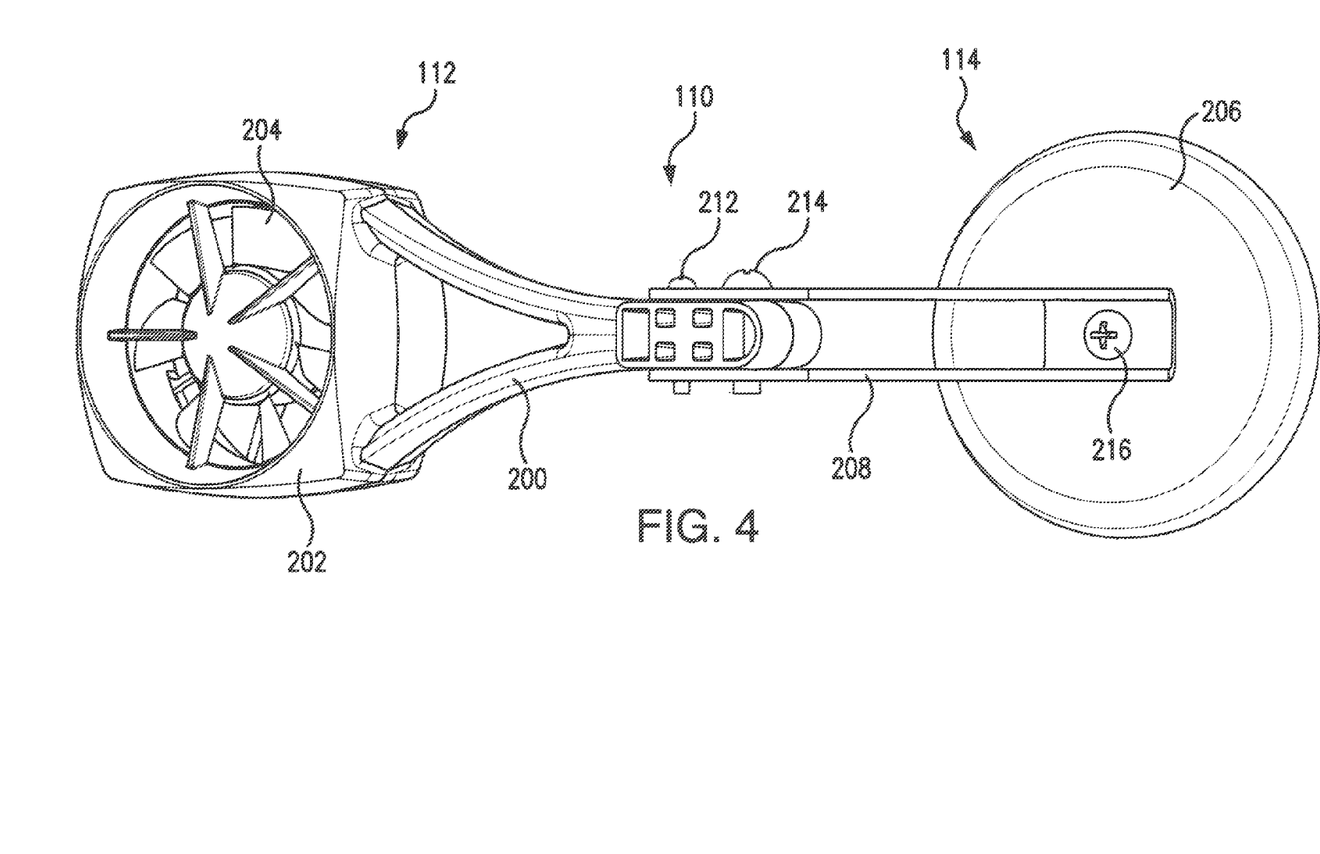
Figure 5:
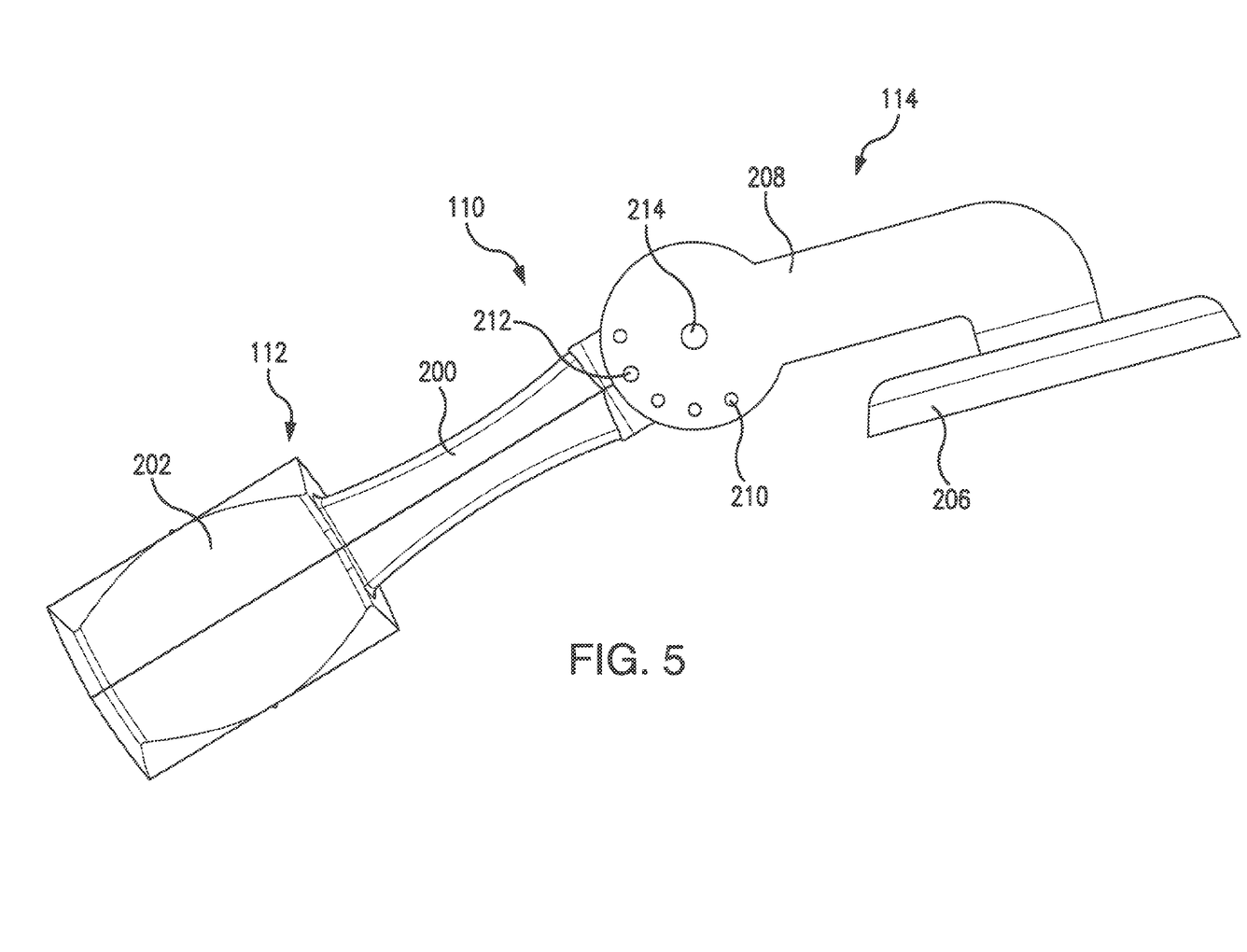
Figure 6:
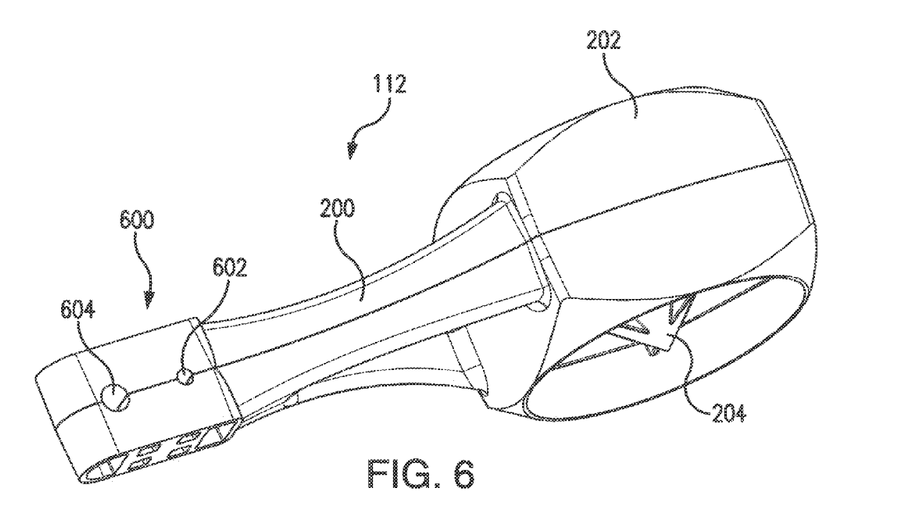
Figure 7A:
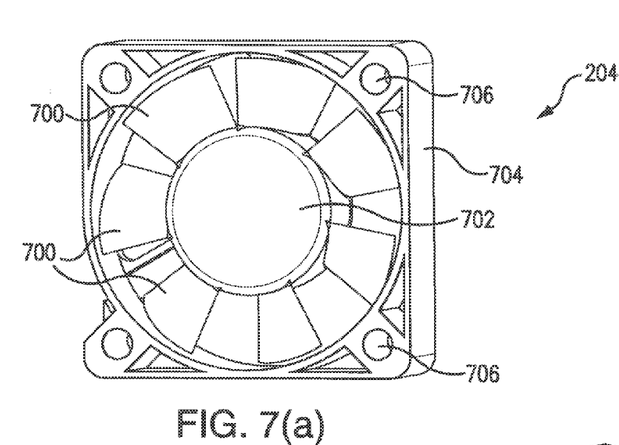
Figure 7B:
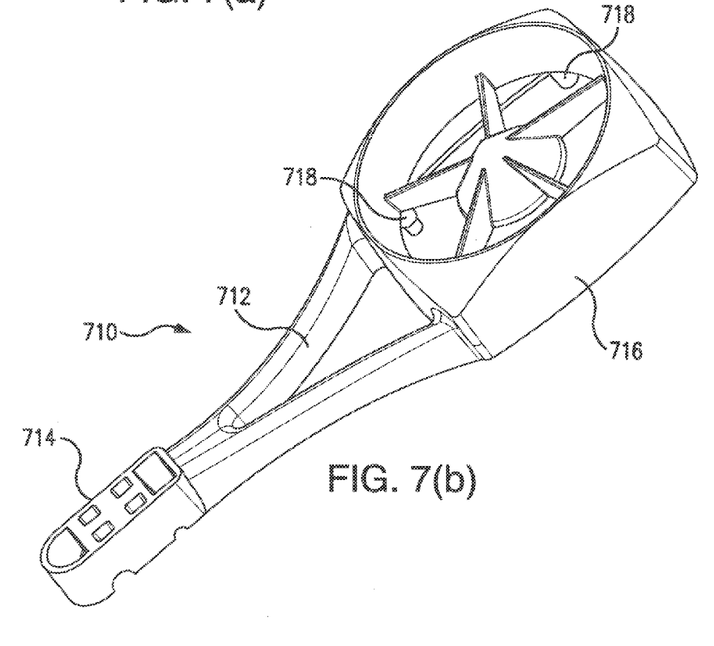
Figure 8:
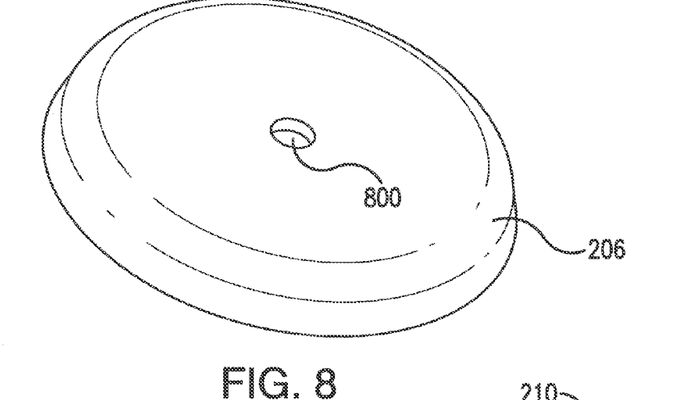
Figure 9:
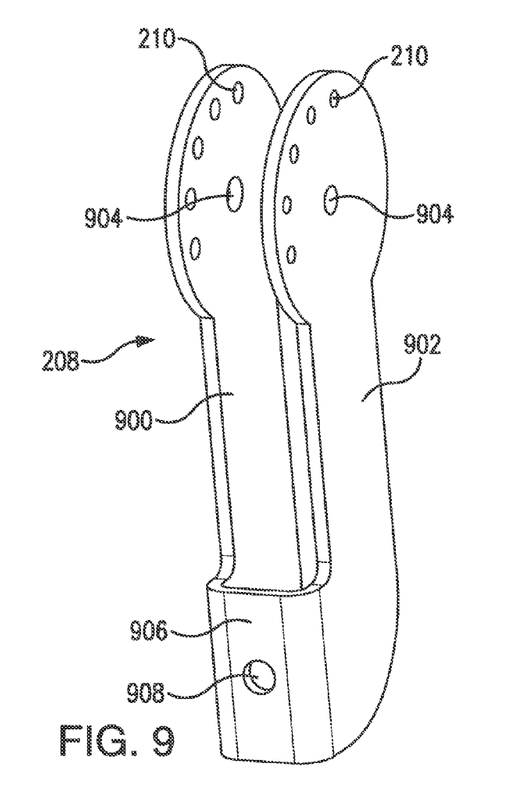
Figure 10:
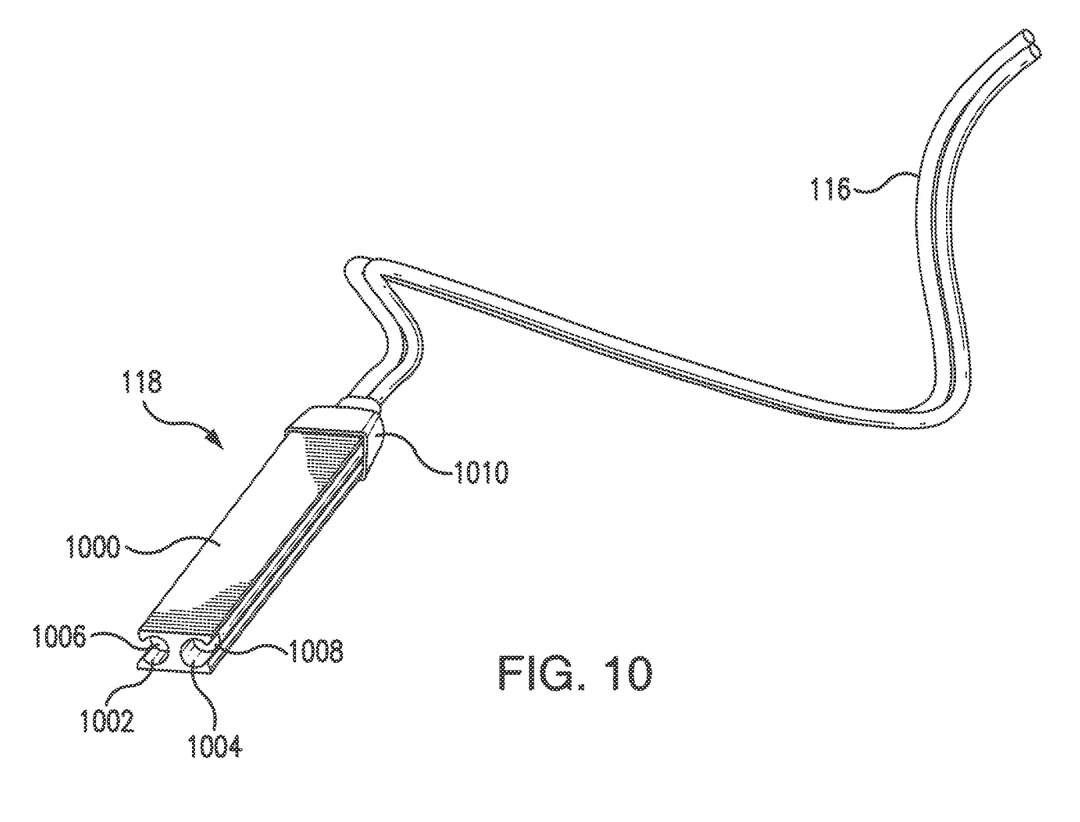

FIG. 10 illustrates a perspective view of the electrode assembly in accordance with exemplary embodiments of the present invention. The electrode assembly 118 includes a shell 1000 which includes two openings 1002 and 1004 configured to house an anode 1006 and a cathode 1008. The shell 1000 may have an approximately H-shaped profile. The shell 1000 may be made from a plastic extrusion. The shell 1000 insulates the electrodes from any metal surfaces that it could be placed in (i.e. metal condensate pans), which eliminates any electrolysis path to the actual air-handling unit 102. The shell 1000 also electrically insulates the anode 1006 and cathode 1008 from one another, and provides a fixture to hold the anode 1006 and cathode 1008 parallel to one another while providing a physical barrier between them. In an embodiment of the present invention, the anode 1006 may be copper or silver. The anode 1006 may be 40%-60% pure silver combined with 40%-60 pure copper, and, preferably, the anode 1006 is 55% silver and 45% copper. In some embodiments, 0-3% nickel may be added to the anode 1006 during alloying. The cathode 1008 may be pure zinc. The electrode assembly 118 is configured to receive energy from the turbine 110 and produce copper silver ions from the anode 1006. The cathode 1008 is configured to assist the anode 1006 in driving off ions, which reduce the growth of microbial contamination. The copper and silver ions reduce the growth of microbial contamination, such as bacteria, virus, mold and biofilms, and help prevent corrosion. The electrode assembly 118 may also include a shrink tube 1010 configured to receive the wire 116 at one end and receive the shell 1000 at a second end. The electrode assembly 118 is soldered to a thin flexible wire 116. These connection points are then filled with 100% silicone and then heat shrink covered with the shrink tube 1010, which effectively isolates the solder wire joint and seals any water out from these connection points.

Figure 11:
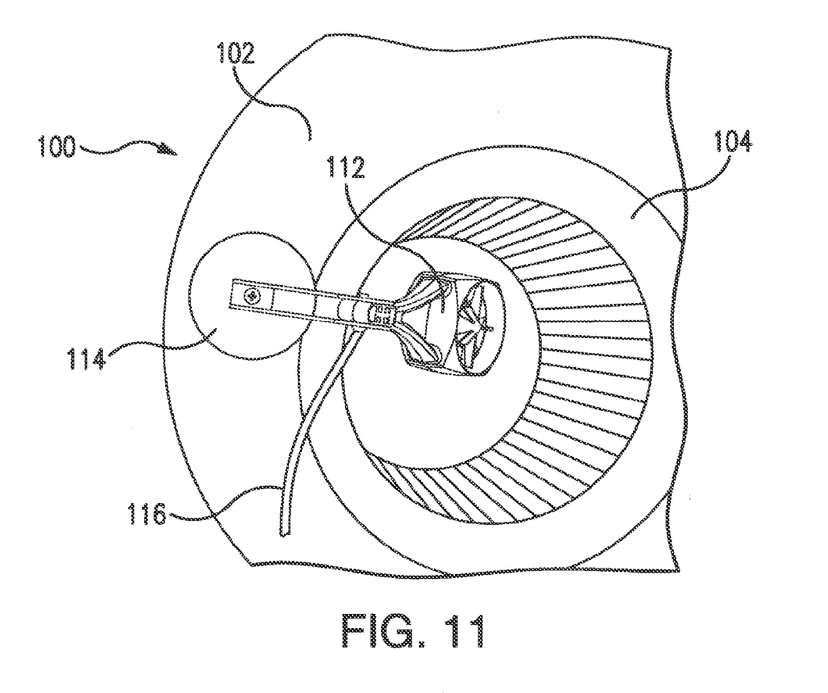
Figure 12:
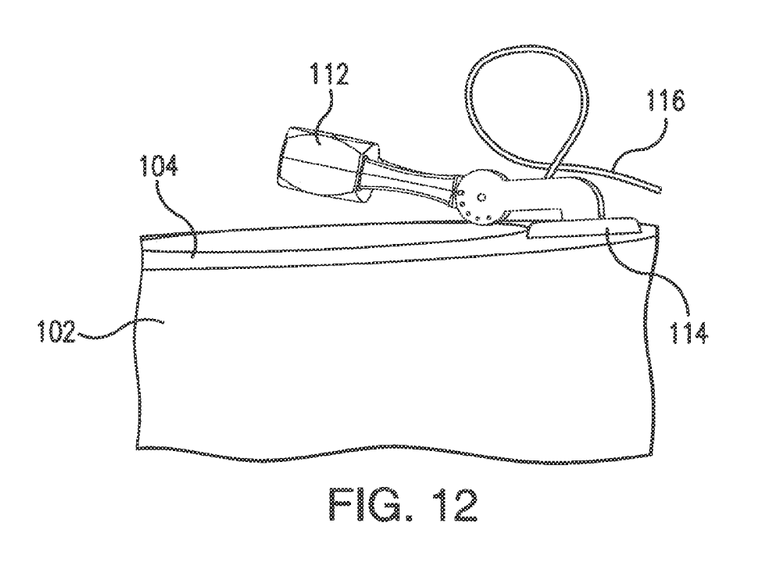
Figure 13A:
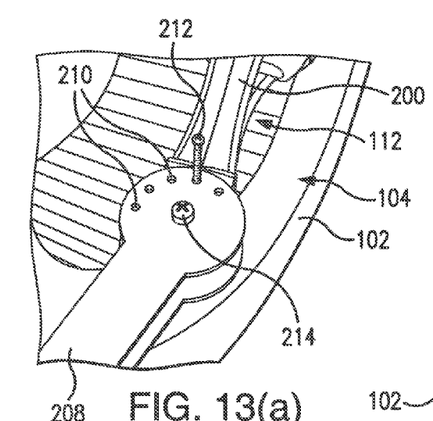
Figure 13B:
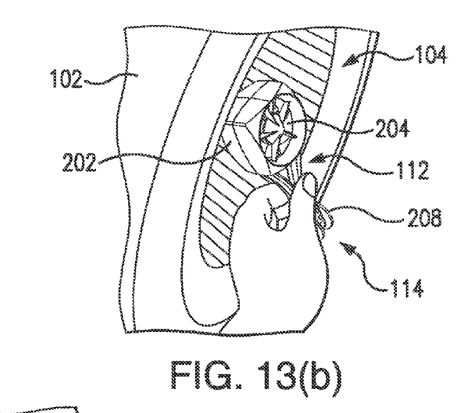
Figure 13C:
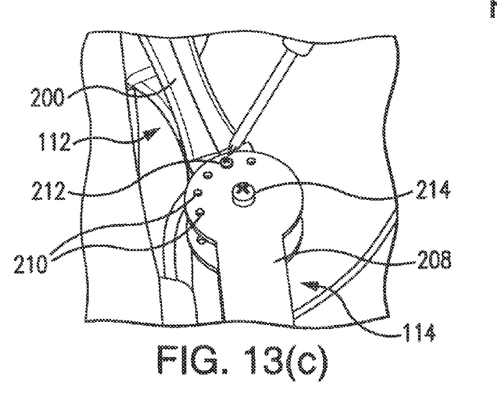

FIGS. 11-13 illustrate an apparatus for reducing the growth of microbial contamination coupled to an air-handling unit. The turbine 112 is mounted to the air-handling unit 102 via the mount 114. The turbine 112 is positioned such that it is in the flow of air 105 generated by the fan 104. The angle of the turbine 112 relative to the mount 114 and the direction of the air flow 105 may be adjusted. As can be seen in FIGS. 13(a)-(c), the first coupling member 212 can be removed and the turbine 112 can be pivoted about the second coupling member 214. The turbine 112 may be locked into position by aligning the first opening of the turbine 602 with one of the first openings of the mount 210 and engaging the openings with the first coupling member 212. The angle of the turbine 112 relative to the direction of the air flow will adjust the amount of wind energy captured by the turbine. When the face of the turbine 112 is approximately perpendicular to the direction of the air flow, the turbine 112 capture the maximum possible amount of wind energy. However, for stronger air-handling units, i.e., with faster flows of air, the face of the turbine 112 relative to the direction of the air flow must be less than 90 degrees because the turbine 112 could be overdriven.

While various embodiments have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of Illustration. Accordingly, it is contemplated that some steps may be added, some steps may be omitted, the order of the steps may be re-arranged, and some steps may be performed in parallel.

I claim:

1. An apparatus for reducing the growth of microbial contamination in air-handling unit, comprising:
    a mounting member configured to couple with a housing of an air-handling unit;
    a turbine coupled with said mounting member and configured to produce energy when positioned in an air flow path through the air-handling unit; and
    an anode configured to be placed in a condensate pan and receive energy from the turbine, wherein the anode produces agents that reduce the growth of microbial contamination when energized.

2. The apparatus according to claim 1, wherein the mounting member includes a magnetic base configured to couple with the housing of the air-handling unit.

3. The apparatus according to claim 1, wherein the mounting member includes a support arm and the turbine is coupled to the support arm.

4. The apparatus according to claim 3, wherein an angle of the turbine relative to the support arm is adjustable.

5. The apparatus according to claim 4, wherein the support arm includes a plurality of coupling points and a coupling member configured to couple the turbine to at least one of the plurality of coupling points.

6. The apparatus according to claim 1, wherein an angle of the turbine relative to the mounting member is adjustable.

7. The apparatus according to claim 1, wherein the anode is coupled to the turbine by a wire, and the wire is configured to transfer energy from the turbine to the anode.

8. The apparatus according to claim 1, wherein the anode is configured to release silver ions when energized.

9. The apparatus according to claim 1, wherein the anode is configured to release copper ions when energized.

10. The apparatus according to claim 1, wherein the turbine is a wind turbine.

11. The apparatus according to claim 1, wherein the turbine includes a turbine arm, a rotor housing and a rotor.

12. The apparatus according to claim 11, wherein the rotor includes a plurality of blades.

13. The apparatus according to claim 1, wherein the anode is comprised of silver.

14. The apparatus according to claim 1, wherein the anode is comprised of copper.

15. The apparatus according to claim 1, wherein the microbial contamination includes one or more of bacteria, virus, mold and biofilms.

16. The apparatus according to claim 1, wherein the anode is housed in an electrode assembly, and the electrode assembly comprises a zinc cathode configured to assist the anode to produce the agents that reduce the growth of microbial contamination.

17. An air-handling system, comprising:
    an air-handling unit including a housing, a fan, a condensate line and a condensate pan, wherein the fan is capable of generating a flow of air through the air-handling unit; and
    an apparatus for reducing the growth of microbial contamination in the air-handling unit, comprising:
        a mounting member configured to couple with a housing of an air-handling unit;

a turbine coupled with said mounting member and configured to produce energy when positioned in an air flow path through the air-handling unit; and an anode configured to be placed in the condensate pan and receive energy from the turbine, wherein the anode produces agents that reduce the growth of microbial contamination when energized.

18. The system according to claim 17, wherein the mounting member includes a magnetic base configured to couple with the housing of the air-handling unit.

19. The system according to claim 17, wherein the mounting member includes a support arm and the turbine is coupled to the support arm.

20. The system according to claim 19, wherein an angle of the turbine relative to the support arm is adjustable.

21. The system according to claim 20, wherein the support arm includes a plurality of coupling points and a coupling member configured to couple the turbine to at least one of the plurality of coupling points.

22. The system according to claim 17, wherein an angle of the turbine relative to the mounting member is adjustable.

23. The system according to claim 17, wherein the anode is coupled to the turbine by a wire, and the wire is configured to transfer energy from the turbine to the anode.

24. The system according to claim 17, wherein the anode is configured to release silver ions when energized.

25. The system according to claim 17, wherein the anode is configured to release copper ions when energized.

26. The system according to claim 17, wherein the turbine is a wind turbine.

27. The system according to claim 17, wherein the turbine includes a turbine arm, a rotor housing and a rotor.

28. The system according to claim 27, wherein the rotor includes a plurality of blades.

29. The system according to claim 17, wherein the anode is comprised of silver.

30. The system according to claim 17, wherein the anode is comprised of copper.

31. The system according to claim 17, wherein the microbial contamination includes one or more of bacteria, virus, mold and biofilms.

32. The system according to claim 17, wherein the anode is housed in an electrode assembly, and the electrode assembly comprises a zinc cathode configured to assist the anode to produce the agents that reduce the growth of microbial contamination.

33. A method for reducing microbial contamination in an air-handling unit, comprising the steps of:

mounting a turbine to the air-handling unit such that the turbine is positioned in a flow of air through the air-handling unit and placing an anode configured to produce agents that reduce the growth of microbial contamination when energized in a condensate pan of the air-handling unit, wherein the anode is configured to receive energy from the turbine.

34. The method according to claim 33, further comprising the step of adjusting the angle of the turbine relative to the flow of air through the air-handling unit.

35. The method according to claim 33, wherein the anode is configured to produce silver ions.

36. The method according to claim 33, wherein the anode is configured to produce copper ions.

* * * * *